(No Model.)

S. J. MYERS.
NUT LOCK.

No. 494,707. Patented Apr. 4, 1893.

Witnesses
C. A. Ford
N. T. Riley

Inventor
Sheridan J. Myers

By his Attorneys,
C. A. Snow & Co.

UNITED STATES PATENT OFFICE.

SHERIDAN J. MYERS, OF HEBRON, MISSISSIPPI.

NUT-LOCK.

SPECIFICATION forming part of Letters Patent No. 494,707, dated April 4, 1893.

Application filed January 21, 1893. Serial No. 459,211. (No model.)

*To all whom it may concern:*

Be it known that I, SHERIDAN J. MYERS, a citizen of the United States, residing at Hebron, in the county of Lawrence and State of Mississippi, have invented a new and useful Nut-Lock, of which the following is a specification.

The invention relates to improvements in nut locks.

The object of the present invention is to improve the construction of nut locks, and provide one which will be especially adapted for rail joints, and in which a nut may be securely locked at any desired point, and which may be readily screwed up and tightened from time to time.

The invention consists in the construction and novel combination and arrangement of parts hereinafter fully described, illustrated in the accompanying drawings and pointed out in the claim hereto appended.

Figure 1:
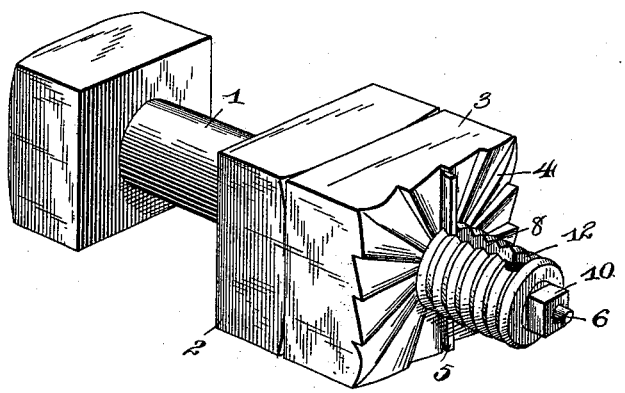
Figure 2:
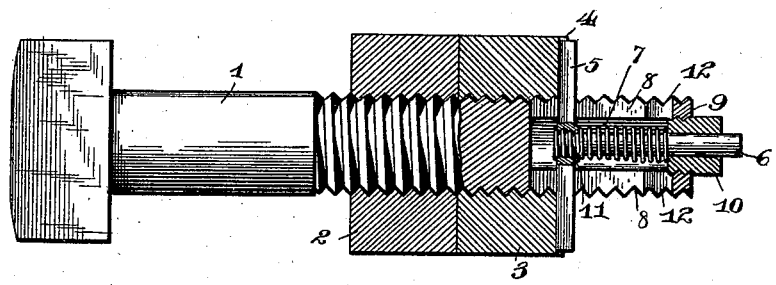
Figure 3:
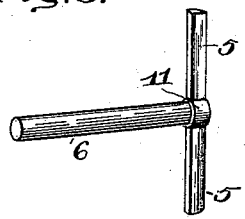

In the drawings—Figure 1 is a perspective view of a nut lock constructed in accordance with this invention. Fig. 2 is a longitudinal sectional view. Fig. 3 is a detail perspective view of the pin and the transverse bar at the inner end of the same.

Like numerals of reference indicate corresponding parts in all the figures of the drawings.

1 designates a bolt having an ordinary nut 2 arranged on its threaded portion, and provided with a ratchet nut 3, which has on its outer face ratchet teeth 4 adapted to be engaged by opposite pawls 5 of a spring actuated pin 6. The spring actuated pin is arranged in a longitudinal bore 7 of the bolt, and the pawls 5 extend through openings 8 in the bolt at opposite sides thereof and communicating with the bore. The outer end of the bore is threaded at 9 to receive a nut 10 for securing the spring actuating pin in the bore. The pin extends through an opening in the center of the securing nut 10, and its inner end is threaded and engages a threaded socket 11 of a transverse bar. The transverse bar, which is arranged at the inner end of the pin, has the socket 11 at its center and extends laterally from opposite sides of the pin to form the pawls 5, which have their inner longitudinal edges beveled to engage the ratchet teeth.

The ratchet teeth of the nut 3 are shouldered in one direction to enable the nut to be screwed up and to prevent the same unscrewing. The openings 8 at the sides of the bolt have their outer ends enlarged at 12 to permit the passage of the socket 11.

The nut lock is particularly adapted for rail joints, and in the accompanying drawings it is shown applied to the form of bolt usually employed in rail joints, but it is equally applicable to all classes of machinery in which nut locks are employed.

It will be seen that the nut lock is simple an inexpensive in construction and effective in operation, and that the spiral spring and the pin, which is actuated by the same, are located within the bolt and are thereby protected.

Changes in the form, proportion and the minor details of construction may be resorted to without departing from the principle or sacrificing any of the advantages of this invention.

What I claim is—

In a nut lock, the combination of a bolt having a longitudinal bore with the outer end thereof interiorly threaded and provided at opposite sides with openings communicating with the bore and having their outer ends enlarged, a nut 2 arranged on the bolt, a ratchet nut provided on its outer face with ratchet teeth, a securing nut having a central opening and arranged in the outer ends of the longitudinal bore of the bolt, a pin arranged in the opening of the securing nut and the bore of the bolt, a transverse bar having a central socket receiving the inner end of the pin and projecting laterally through the openings at the sides of the bolt and engaging the ratchet nut, and a spiral spring disposed on the pin, arranged within the bolt and interposed between the securing nut and the transverse bar, substantially as described.

In testimony that I claim the foregoing as my own I have hereto affixed my signature in the presence of two witnesses.

SHERIDAN J. MYERS.

Witnesses:
THOMAS L. MENDENHALL,
THOMAS A. DICKSON.